United States Patent [19]

Jeng

[11] Patent Number: 5,437,510

[45] Date of Patent: Aug. 1, 1995

[54] FIXING DEVICE OF BICYCLE PEDAL AXLE

[76] Inventor: Jin-Chyr Jeng, 101, Chu-Shoei, Shi-Pyng Villiage, Yuan-Li Township, Myau-Lih County, Taiwan

[21] Appl. No.: 220,181

[22] Filed: Mar. 30, 1994

[51] Int. Cl.6 .......................................... F16C 19/28
[52] U.S. Cl. ................................. 384/538; 384/540; 384/545
[58] Field of Search ............... 384/538, 545, 267, 268, 384/540, 512

[56] References Cited

U.S. PATENT DOCUMENTS

| 4,545,691 | 10/1985 | Kastan et al. | 384/538 |
| 4,576,503 | 3/1986 | Orain | 384/538 |
| 5,181,437 | 1/1993 | Chi | 384/545 |
| 5,197,809 | 3/1993 | Chi | 384/538 |

Primary Examiner—Lenard A. Footland
Attorney, Agent, or Firm—Larson & Taylor

[57] ABSTRACT

A fixing device of a bicycle pedal axle comprises an axle tube, an inner sleeve and a threaded casing. The axle tube is fitted into the inner sleeve and provided peripherally at the front end thereof with a bevel tapered surface. The threaded casing is fitted into the axle tube such that an outer threaded portion of the threaded casing engages a threaded end of the axle tube. The threaded casing is provided additionally with a plurality of tangent slots and an inner come engageable with the bevel tapered surface of the inner sleeve.

1 Claim, 5 Drawing Sheets

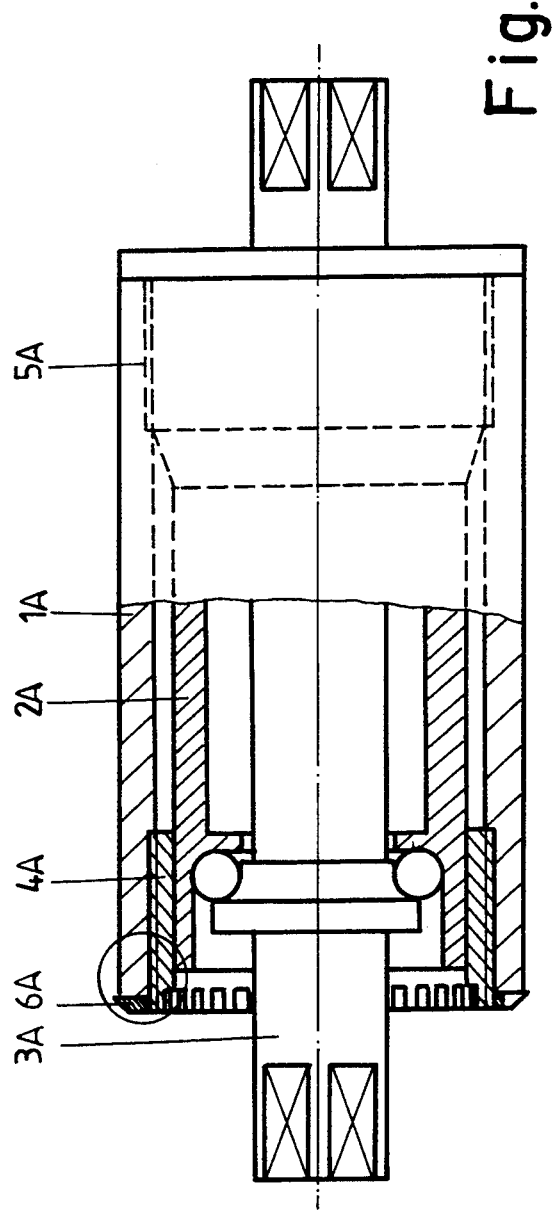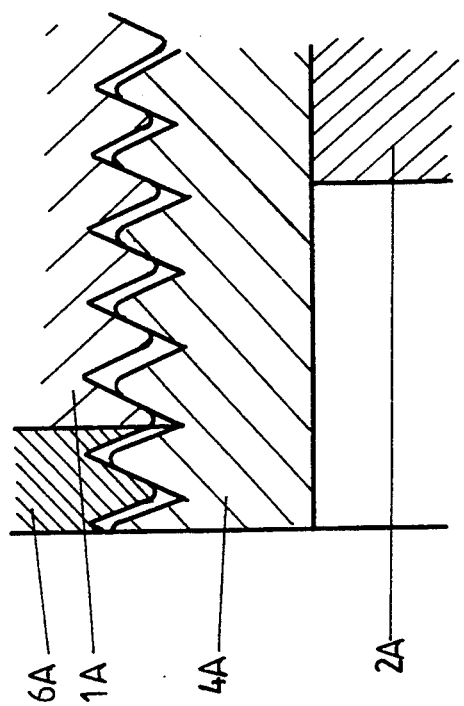

FIXING DEVICE OF BICYCLE PEDAL AXLE

BACKGROUND OF THE INVENTION

The present invention relates generally to a bicycle pedal, and more particularly to a device for fixing securely a bicycle pedal axle.

As shown in FIG. 1, the bottom junction of a conventional bicycle frame is provided with an axle tube 1A having one end that is fastened with an inner sleeve 2A. The inner sleeve 2A cooperating with the axle tube 1A in which a pedal axle 3A is fixed. The inner sleeve 2A is provided at another end thereof with a threaded casing 5A which is fixed in the axle tube 1A. The threaded casing 4A is fastened by a threaded tube 6A. In other words, the pedal axle 3A is fixed by means of the threaded casing 5A. As a result, the pedal axle 3A can not be hold horizontally all the time. In addition, the pedal axle 3A can become too loose or too tight in view of the fact that the threaded casing 5A can become loosened after a prolonged use of the bicycle.

SUMMARY OF THE INVENTION

It is therefore the primary objective of the present invention to provide a bicycle with a pedal axle fixing device capable of fastening securely the pedal axle so as to prolong the service life span of the pedal axle of the bicycle.

The foregoing of the present invention is attained by the pedal axle fixing device ,which comprises a pedal axle tube provided therein with an inner sleeve having a tapered surface. The inner sleeve is provided thereon with a threaded casing having a plurality of tangent slots engageable securely with the inner threads of the pedal axle bube so as to fasten securely the pedal axle of the bicycle.

The foregoing objective structures, features and functions of the present invention will be more readily understood by studying the following detailed description of the present invention in conjunction with the drawings provided herewith.

BRIEF DESCRIPTION OF THE DRAWINGS

FIG. 1 shows a sectional view of a bicycle pedal axle of the prior art.

FIG. 1A is an enlarged view of the circled portion of FIG. 1.

DETAILED DESCRIPTION OF THE INVENTION

Figure 2:
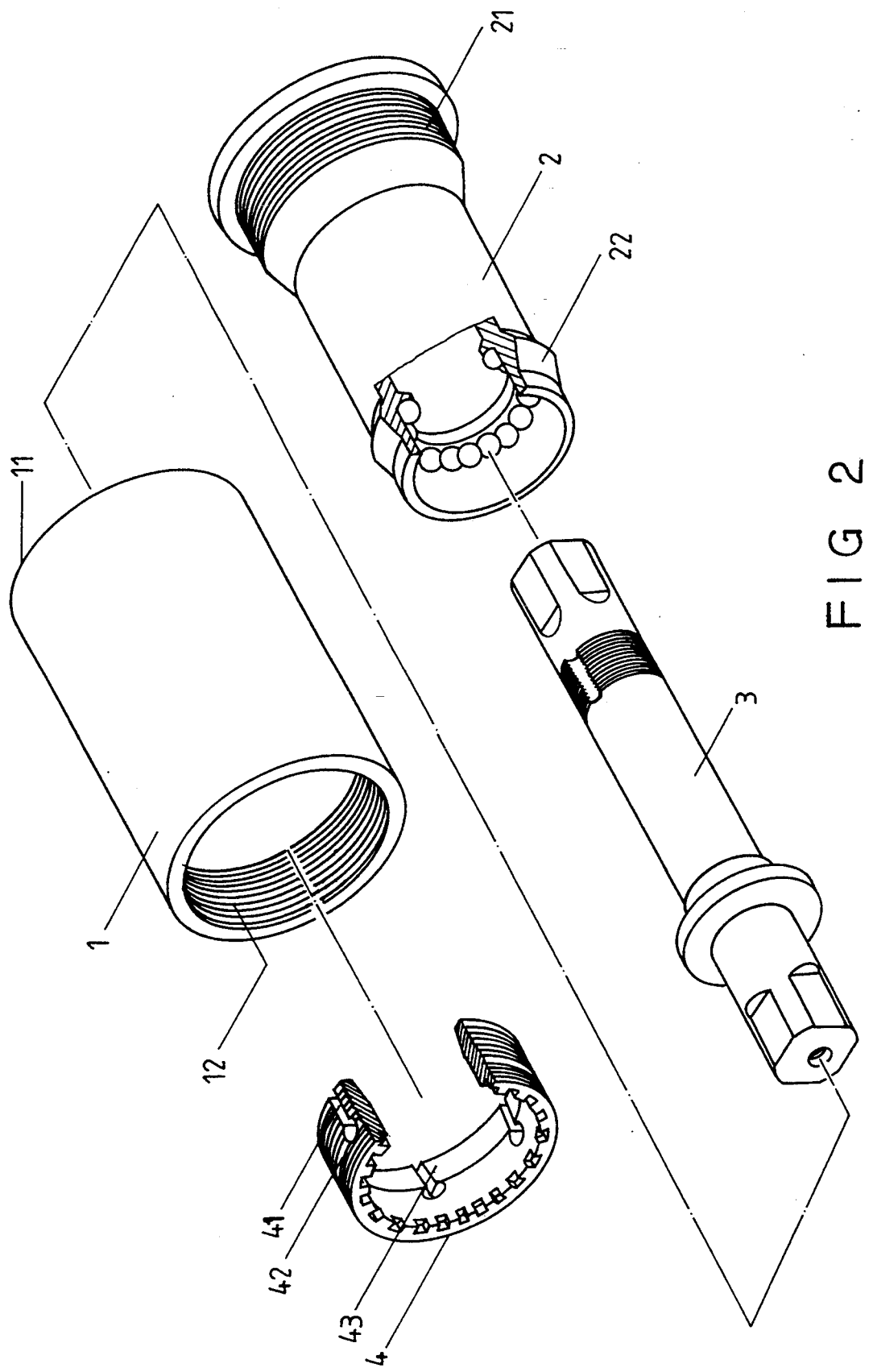
FIG. 2 shows an exploded view of the present invention.
Figure 3:
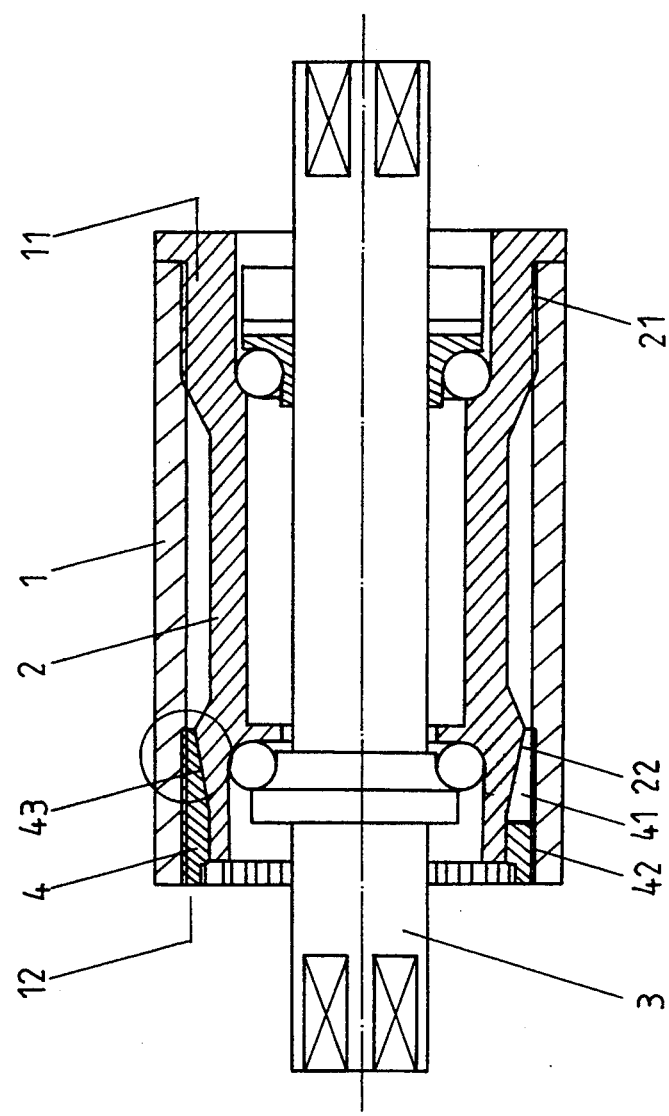
FIG. 3 shows a sectional view of the present invention in combination.

As shown in FIG. 2, the present inveniton comprises an axle tube 1 having two threaded ends 11 and 12. The axle tube 1 is fitted over an inner sleeve 2 such that the threaded end 11 of the axle tube 1 engages a threaded portion 21 of the inner sleeve 2 having another end provided peripherally with a bevel tappered surface 22. A pedal axle 3 is fitted into the inner sleeve 2. A threaded casing 4 is fitted into the axle tube 1 such that an outer threaded portion 42 of the threaded casing engageds the threaded end 12 of the axle tube 1. The threaded casing 4 is provided peripherally in the inner end thereof with a plurality of tangent slots 41. In addition, the threaded casing 4 is provided therein with an inner cone 43.

Figure 4A:
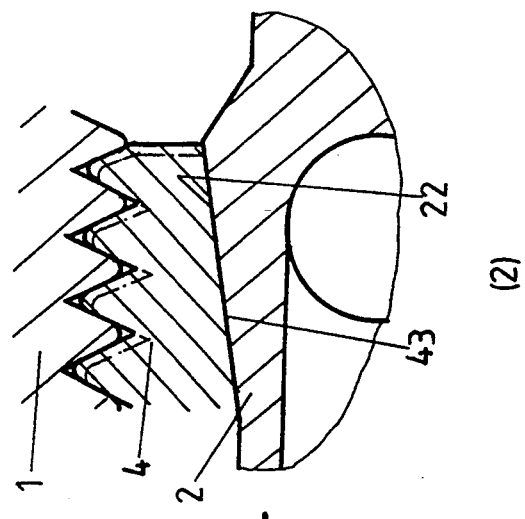
FIG. 4 shows a schematic view of the present invention in action.
Figure 4B:
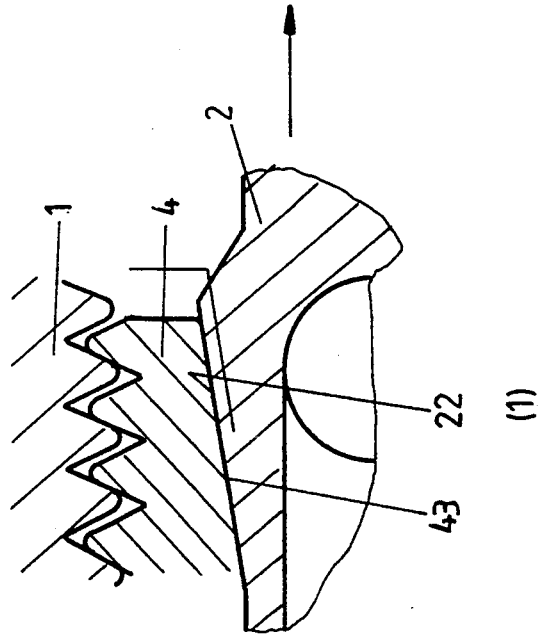
Figure 5:
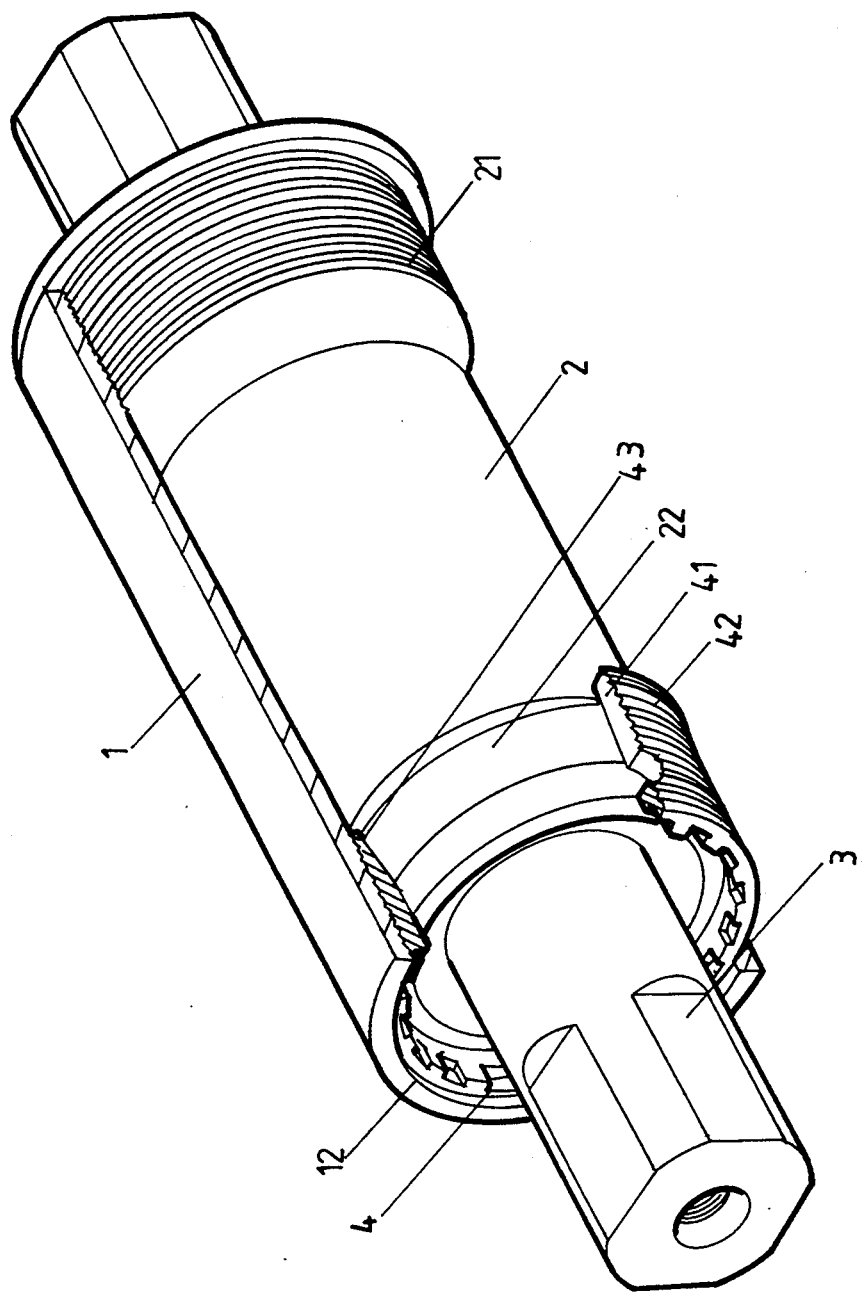
FIG. 5 shows a perspective sectional view of the present invention.

As illustrated in FIGS. 3, 4A, 4B and 5, the inner sleeve 2 is fitted into the axle tube 1 while the threaded casing 4 is fitted into one end of the axle tube 1 such that the inner cone 43 of the threaded casing 4 engages intimately the bevel tappered surface 22 of the inner sleeve 2. As the threaded casing 4 is forced to advance into the axle tube 1, the inner cone 43 of the threaded casing 4 is caused to expand to make contact intimately with the threaded end 12 of the axle tube 1, as shown in FIG. 4A and 4B, respectively, in view of the fact that the threaded casing 4 is provided with a plurality of tangent slots 41. As a result , the threaded casing 4 can not be caused to loosen at the time when the pedal axle 3 is caused to rotate.

The embodiment of the present invention described above is to be regarded in all respects as merely illustrative and not restrictive, Accordingly, the present invention can be embodied in other specific forms without deviating from the spirit thereof, The present invention is therefore to be limited only by the scope of the following appended claim.

What is claimed is:

1. A fixing device of a bicycle pedal axle comprising an axle tube, an inner sleeve, and a threaded casing; wherein said inner sleeve is fitted into said axle tube and provided peripherally at the front end thereof with a bevel tapered surface, and wherein said threaded casing is fitted into said axle tube such that an outer threaded portion of said threaded casing engages a threaded end of said axle tube, said threaded casing being further provided peripherally at the inner end thereof with a plurality of tangent slots, said threaded casing being still further provided therein with an inner cone engageable with said bevel tapered surface of said inner sleeve.

* * * * *